US006243793B1

(12) United States Patent
Aucsmith et al.

(10) Patent No.: US 6,243,793 B1
(45) Date of Patent: Jun. 5, 2001

(54) PROTOCOL FOR ARBITRATING ACCESS TO A SHARED MEMORY AREA USING HISTORICAL STATE INFORMATION

(75) Inventors: David W. Aucsmith, Portland; Robert C. Knauerhase, Hillsboro; James C. Stanley, Portland, all of OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 08/906,134

(22) Filed: Jul. 25, 1997

Related U.S. Application Data

(63) Continuation of application No. 08/507,962, filed on Jul. 27, 1995, now abandoned.

(51) Int. Cl.[7] ............................. G06F 12/14; G06F 13/18
(52) U.S. Cl. .................................. 711/151; 711/152
(58) Field of Search ................................ 711/152, 151

(56) References Cited

U.S. PATENT DOCUMENTS

| 4,402,046 | * | 8/1983 | Cox et al. .................. 709/213 |
| 5,274,809 | * | 12/1993 | Iwasaki et al. .............. 709/104 |
| 5,377,352 | * | 12/1994 | Tanaka et al. ............... 709/103 |
| 5,455,920 | * | 10/1995 | Muramatsu .................. 709/215 |
| 5,485,593 | * | 1/1996 | Baker ........................ 709/216 |
| 5,754,800 | * | 5/1998 | Lentz et al. ................. 710/116 |

* cited by examiner

Primary Examiner—Reginald G. Bragdon
(74) Attorney, Agent, or Firm—Blakely, Sokoloff, Taylor & Zafman LLP

(57) ABSTRACT

A method and apparatus for arbitrating access to a shared memory is disclosed. A memory marking unit in the shared memory is read to determine whether the shared memory is currently being accessed by another processor. If the shared memory is not being accessed by another processor, a processor seeking access is granted access. The processor changes the contents of the memory marking unit to lock out other processors from the shared memory. The last task performed on the shared memory space is identified and used to determine whether a task with high priority exists. If a task with high priority exists, the task is performed. If a task with high priority does not exist, the processor having access to the shared memory space accesses the shared memory space for its intended purpose. After the processor is finished accessing the shared memory space, it records the identity of the task performed and unlocks the shared memory space.

13 Claims, 8 Drawing Sheets

PROTOCOL FOR ARBITRATING ACCESS TO A SHARED MEMORY AREA USING HISTORICAL STATE INFORMATION

This is a continuation of application Ser. No. 08/507,962, filed Jul. 27, 1995, now abandoned.

FIELD OF THE INVENTION

The present invention relates to communication between computer systems. More specifically, the present invention relates to an apparatus and method for arbitrating access to a shared memory area.

BACKGROUND OF THE INVENTION

When processors share a common memory area, coordination of memory access between the processors is necessary. Coordination of memory access insures that data written in the shared memory area are not prematurely overwritten by one processor before being read by another processor. Coordination of memory access also insures that two processors will not simultaneously attempt to access the shared memory area. Without coordination of memory access, systems sharing a common memory area may experience data loss or more seriously, hardware failure.

One approach to coordinating memory access is the use of a master processor. A master processor manages the activities of slave processors on shared memory. A master processor keeps track of the different areas in memory which are accessed and the purpose for which they are used. Each slave processor seeking access to the shared memory must first receive permission from the master processor. Typically, the master processor arbitrates memory access between slave processors by taking into account the priority of the tasks to be performed and whether the memory is currently being accessed by another processor.

Another approach for coordinating memory access is self-arbitration of processors through the use of an out-of-band transmission path. Typically, a separate bus which is not a memory-access bus is used to transmit state information from one processor to another sharing the common memory area. This allows the processors to coordinate memory access among themselves. For example, after a first processor is finished writing data to a location in the shared memory, the first processor can give access to that location of shared memory to a second processor to read that information by signaling the second processor through the out-of-band transmission path. Only the second processor can access the shared memory at that time for that specific purpose.

The use of a master processor has several drawbacks. Typically, processors require a large amount of power to operate. This is a problem for computer systems operating under tight power constraints, such as systems operating with batteries. Processors are also relatively large in size compared to other IC components. Thus, depending upon the environment of the computer system, the availability of physical space may not permit the implementation of an additional processor. Perhaps most importantly, the use of an additional processor for the purpose of memory arbitration adds an undesirable cost to the overall computer system.

Self-arbitration also has its limitations. Computer systems wishing to implement self-arbitration must provide an out-of-band transmission path to allow the processors sharing the memory space to communicate with each other. Design specifications of some computer systems may not permit the implementation of an out-of-band transmission path.

Thus, a method and apparatus for arbitrating access to a shared memory which does not require the implementation of an additional processor or an out-of-band transmission path is needed.

SUMMARY OF THE INVENTION

An apparatus and method for arbitrating access to a shared memory is disclosed. One embodiment of a memory unit of the present invention comprises a memory cell for storing data. An access indication unit is coupled to the memory cell. The access indication unit indicates the identity of a first processor accessing the memory cell. A state recorder unit is coupled to the access indication unit. The state recorder unit records a task performed by the first processor. A semaphore unit is also coupled to the access indication unit. The semaphore unit reads the access indication unit and prevents a second processor from accessing the memory cell while the first processor is accessing the memory cell. An arbitration unit is coupled to the access indication unit. The arbitration unit operates to restrict access of the memory cell to one processor at a time.

One embodiment of a system for providing communication between a first computer system and a second computer system of the present invention comprises a memory connecting the first computer system to the second computer system. The memory stores data transferred between the first computer system and the second computer system. An access indication unit is coupled to the memory. The access indication unit indicates the identity of a computer system having access to the memory. A state recorder unit is coupled to the access indication unit. The state recorder unit records a task performed by the processor as a state. A first state engine is coupled to the state recorder unit. The first state engine instructs the first processor how to process the data in the memory in response to reading a previous task recorded in the state recording unit. A second state engine is coupled to the state recorder unit. The second state engine instructs the second processor how to process the data in the memory in response to reading the previous task recorded in the state recording unit.

One embodiment of a method for sending data between a first processor and a second processor comprises the steps of first checking a shared memory space for availability. After checking the shared memory space, identifying a last task performed on the shared memory space. From the last task, determining whether a current task with higher priority must be performed first. Next, transmitting data between the first processor and the shared memory space. After the data are transmitted, recording the present task performed on the shared memory space.

BRIEF DESCRIPTION OF THE DRAWINGS

The present invention will be understood more fully from the detailed description given below and the accompanied drawings of the various features and elements embodied in the invention. The description and drawings are not meant to limit the invention to the specific embodiment. They are provided for explanation and understanding.

DETAILED DESCRIPTION

A novel access controller unit is described. In the following detailed description, numerous specific details are set forth in order to provide a thorough understanding of the present invention. However, it will be understood by those skilled in the art that the present invention may be practiced without these specific details. In other instances, well-known methods, procedures, components, and circuits have not been described in detail so as not to obscure the present invention.

Some portions of the detailed descriptions which follow are presented in terms of algorithms and symbolic representations of operations on data bits within a computer memory. These algorithmic descriptions and representations are the means used by those skilled in the data processing arts to most effectively convey the substance of their work to others skilled in the art. An algorithm is conceived to be a self-consistent sequence of steps leading to a desired result. The steps are those requiring physical manipulations of physical quantities. Usually, though not necessarily, these quantities are electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like. It should be borne in mind, however, that all of these and similar terms are to be associated with the appropriate physical quantities and are merely convenient labels applied to these quantities. Unless specifically stated otherwise as apparent from the following discussions, it is appreciated that throughout the present invention, discussions utilizing terms such as "processing" or "computing" or "calculating" or "determining" or "displaying" or the like, refer to the action and processes of a computer system or similar electronic computing device that manipulates and transforms data represented as physical (electronic) quantities within the computer system's registers and memories into other data similarly represented as physical quantities within the computer system memories or registers or other such information storage, transmission or display devices.

Figure 1:
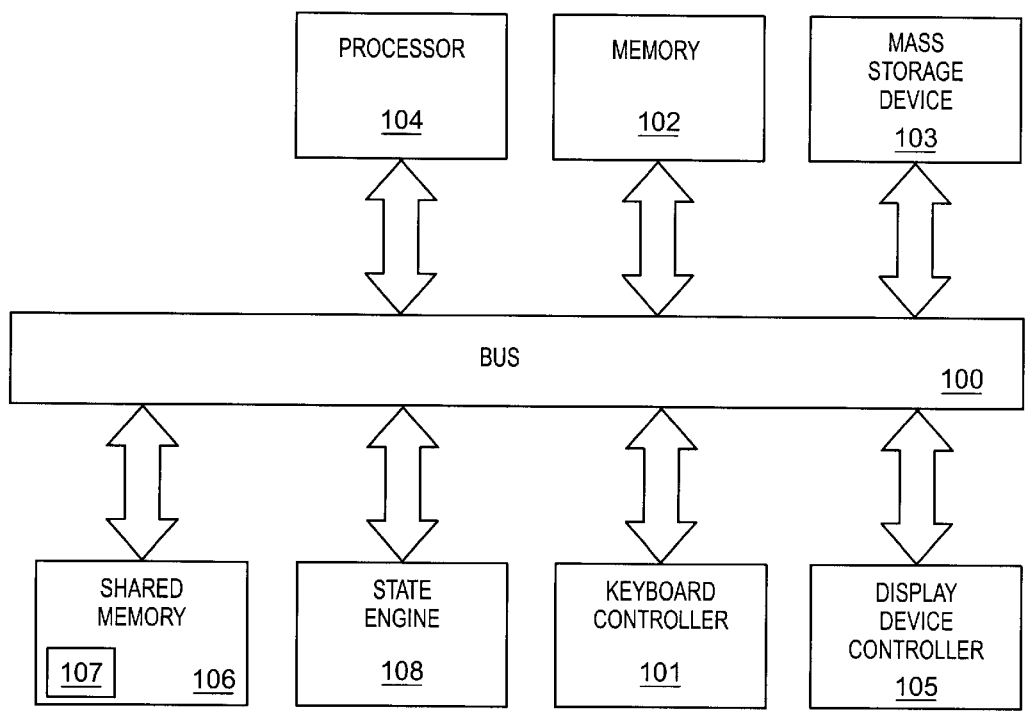
FIG. 1 illustrates an embodiment of the present invention as implemented in a computer system.

FIG. 1 illustrates in block diagram form a computer system of one embodiment of the present invention. The computer system comprises bus 100, keyboard interface 101, external memory 102, mass storage device 103, processor 104 and display device controller 105. Bus 100 is coupled to display device controller 105, keyboard interface 101, microprocessor 104, memory 102 and mass storage device 103. Display device controller 105 can be coupled to a display device. Keyboard interface 101 can be coupled to a keyboard.

Bus 100 can be a single bus or a combination of multiple buses. As an example, bus 100 can comprise an Industry Standard Architectural (ISA) bus, an Extended Industry Standard Architecture (EISA) bus, a system bus, a X-bus, PS/2 bus, a Peripheral Components Interconnect (PCI) bus or other buses. Bus 100 can also comprise any combination of buses. Bus 100 provides communication links between components in the computer system. Keyboard interface 101 can be a keyboard controller or other keyboard interface. Keyboard interface 101 can be a dedicated device or can reside in another device such as a bus controller or other controller. Keyboard interface 101 allows coupling of a keyboard to the computer system and transmits signals from a keyboard to the computer system. External memory 102 can comprise a dynamic random access memory (DRAM) device, a static random access memory (SRAM) device, or other memory devices. External memory 102 stores information and data from mass storage device 103 and processor 104 for use by processor 104. Mass storage device 103 can be a hard disk drive, a floppy disk drive, a CD-ROM device, a flash memory device or other I mass storage device. Mass storage device 103 provides information and data to external memory 102.

Processor 104 processes information and data from external memory 102 and stores information and data in external memory 102. Processor 104 also receives signals from keyboard controller 101 and transmits information and data to display device controller 105 for display on a display device. Processor 104 also transmits video images to the display controller for display on a display device. Processor 104 can be a complex instruction set computing (CISC) microprocessor, a reduced instruction set computing (RISC) microprocessor, a very long instruction word (VLIW) microprocessor or other processor device. Display device controller 105 allows coupling of a display device to the computer system and acts as an interface between the display device and the computer system. Display device controller 105 can be a monochrome display adapter (MDA) card, a color graphics adapter (CGA) card, enhanced graphics adapter (EGA) card, multi-color graphics array (MCGA) card, video graphics array (VGA) card, extended graphics array (XGA) card or other display device controller. The display device can be a television set, a computer monitor, a flat panel display or other display device. The display device receives information and data from processor 104 through display device controller 105 and displays the information and data to the user of the computer system.

The computer system also comprises shared memory 106. Shared memory 106 is coupled to bus 100. Shared memory 106 can comprise a dynamic random access memory (DRAM) device, a static random access memory (SRAM) device, or other memory devices. Shared memory 106 further comprises memory marking unit 107. Memory marking unit 107 operates to record the identity of the microprocessor currently accessing the shared memory 106 and the process that was last performed on the shared memory 106. State engine 108 is coupled to bus 108. State engine 108 receives information regarding which process was last performed on the shared memory 106 from memory marking unit 107. State engine 108 uses this information to instruct processor 104 on what should be done with shared memory 106. Memory marking unit 107 and state engine 108 allows shared memory 106 to be accessed by multiple processors. These processors may either be processors within the same computer system as shared memory 106 or in entirely autonomous computer systems.

Figure 2:
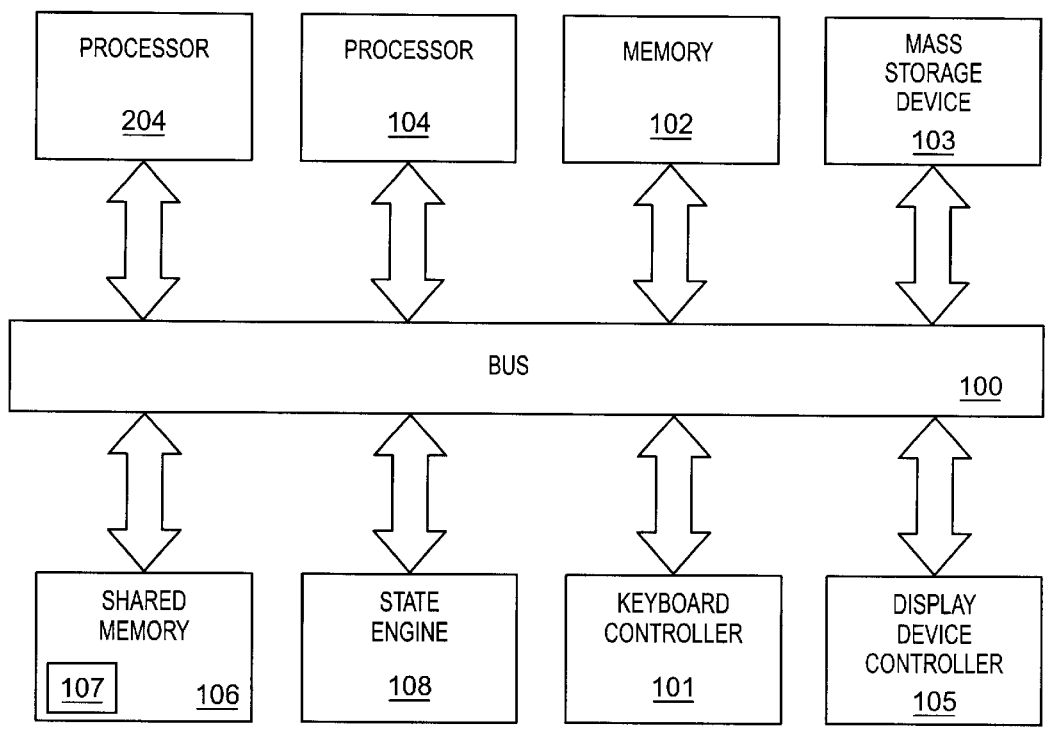
FIG. 2 illustrates an embodiment of the present invention as implemented in a multi-processor computer system.

FIG. 2 illustrates one embodiment of the present invention where shared memory 106 is shared between two processors in the same computer system. Shared memory 106 is shared by processor 104 coupled to bus 100 and processor 204 coupled to bus 100. Memory marking unit 107 and state engine 108 arbitrates the shared memory 106 between processor 104 and processor 204. When either processor 104 or processor 204 seeks access to the shared memory 106, it first reads the content of the memory marking unit 107. If the shared memory is currently being accessed by the other processor, the processor seeking access will not attempt to access the shared memory 106 concurrently. Instead, it will wait and continue to check the status of the shared memory 106 by periodically reading the contents of memory marking unit 107. If, however, the shared memory 106 is not being accessed by the other processor, the processor seeking access changes the contents in memory marking unit 107 to indicate that it currently has access to the shared memory 106. This prevents the other processor from accessing the shared memory 106 while the shared memory 106 is being accessed.

The processor having access to the shared memory 106 loads information from the memory marking unit 107 regarding the process last performed on shared memory 106 into the state engine 108. The state engine 108 uses this information to instruct the processor with access on what it should do with the shared memory 106. The process last performed on the shared memory 106 may require that the processor with access to first perform a task with higher priority before it can do anything else with the shared memory 106. In this situation, the state engine 108 instructs the processor having access to perform this high priority task. If, on the other hand, the process last performed on the shared memory 106 does not require the processor seeking access to perform any other task, the processor is allowed to perform any task it wishes. After the processor having access has completed performing its task, it updates the contents in the memory marking unit 107 to reflect the activities that have occurred. This allows the next processor seeking access to the shared memory 106 to know whether there is a task which it must perform.

In a system with more than two processors coupled to bus 100, the process last performed on shared memory 106 may require that a third processor perform a task having dependency on data currently in shared memory 106 before the processor having access can access the shared memory 106. In this situation, the state engine 108 instructs the process having access to forfeit its access rights and allow the third processor to access the shared memory 106.

Memory marking unit 107 and state engine 108 allows processors in a multi-processor computer system to communicate with one another without an out-of-band transmission path. This allows arbitration of the shared memory space without the additional hardware cost associated with providing a common connection between the processors in the computer system. Memory marking unit 107 and state engine 108 also allows processors in a multi-processor computer system to communicate with one another without a master processor managing the activities in the shared memory space 106. This allows the computer system to operate without consuming additional power, requiring additional space or incurring additional component costs.

Figure 3:
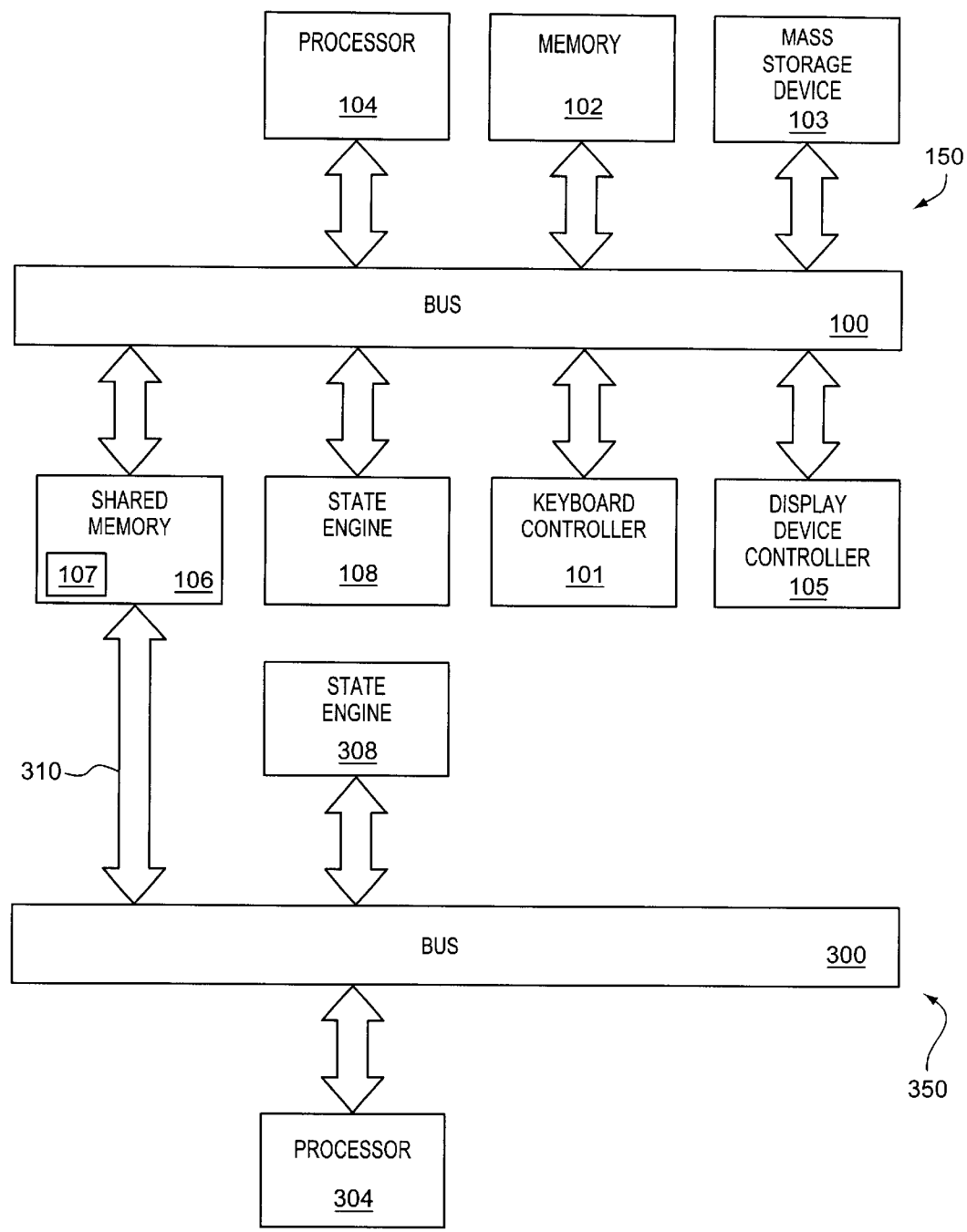
FIG. 3 illustrates an embodiment of the present invention as implemented in two autonomous computer systems.

FIG. 3 illustrates an embodiment of the present invention where shared memory 106 is shared between two processors in two autonomous computer systems. Shared memory 106 is shared by processor 104 in a first computer system 150 and processor 304 in a second computer system 350. Memory marking unit 107 and state engine 108 operate similarly as described in the multiprocessor computer system embodiment to coordinate access of the shared memory to processor 104 in the first computer system 150. The memory marking unit 107 of the first computer system 150 and state engine 308 located in the second computer system 350 operate to coordinate access of the shared memory 106 to processor 304 in the second computer system. When either processor 104 in the first computer system or the processor 304 in the second computer system 350 seeks access to the shared memory 106, it first reads the content of the memory marking unit 107. If the shared memory is currently being accessed by the other processor, the processor seeking access will not attempt to access the shared memory 106 concurrently. Instead, it will wait and continue to check the status of the shared memory 106 by periodically reading the contents of memory marking unit 107. If, however, the shared memory 106 is not being accessed by another processor, the processor seeking access changes the contents in memory marking unit 107 to indicate that it currently has access to the shared memory 106. This prevents the other processor from using the shared memory 106 while the shared memory 106 is being accessed.

The processor having access to the shared memory 106 loads information from the memory marking unit 107 regarding the process last performed on shared memory 106 into a state engine in its computer system. The state engine uses this information to instruct the processor having access on what should be done with the shared memory 106. The process last performed on the shared memory 106 may require that the processor having access first perform a task with higher priority before it can do anything else with the shared memory 106. In this situation, the state engine instructs the processor having access to perform this high priority task. If on the other hand, the process last performed on the shared memory 106 does not require the processor seeking access to perform any other task, the processor is allowed to perform any task it wishes. After the processor having access has completed performing its task, it updates the contents in the memory marking unit 107 to reflect the activities that have occurred. This allows the next processor seeking access to the shared memory 106 to know whether there is a task which it must perform.

In one embodiment of the present invention, shared memory 106 is connected across a PCMCIA slot 310 of the second computer system 350. The memory marking unit 107 and state engine 108 of the first computer system 150 and the second state engine 308 of the second computer system 350 allow communication between the computer systems to take place through the shared memory space 106. The advantage of using a shared memory region simplifies implementation of the system. Other methods of communication between processors (a special bus, through a serial line or network, etc.) require extra hardware, extra software complexity, or both. Additionally, making the data available through a shared memory removes some of the need for each CPU to copy data from some communications channel to its own memory; since the shared space appears as any other RAM, the CPU does not always have to spend time copying to/from the communication channel.

Communication through shared space 106 allows remote procedure calls (RPC) to be made between the two computer systems. RPC is the mechanism by which an application on one computer system can use the system services (libraries) on the other. For example, application on the first computer system 150 can use RPC for accessing CPU-intensive routines on the second computer system 350 or vice versa. The RPC interface also allows one computer system to provide system information to the other computer system. The present invention also allows inter-process communication (IPC). IPC allows information to be sent between two running tasks on two different computer systems. Applications of one computer system are permitted to communicate outside the computer system. For example, a key program in one computer system may talk to a doorknob application in a smart door, or a banking program in one computer system may talk to a automated teller machine (ATM) program in an ATM.

Both processors 104 and 304 respond to changes in the marked memory unit 107. Processors 104 and 304 can implement a polling routine which periodically checks the status of the memory marking unit 107. When the contents of memory marking unit 107 is changed to reflect the completion of a task, processors 104 and 304 activate state engines 108 and 308 in their respective computer system. From the information regarding the last task performed on shared memory 106, state engines 108 and 308 instruct the processors on what should be done with the shared memory 106.

Processors 104 and 304 can also implement circuitry which monitors the status of the memory marking unit 107 and sends an interrupt to the processors 104 and 304 whenever the contents of the memory marking unit 107 is changed. In turn, the processors 104 and 304 start the state engines 108 and 308 which instruct the processors 104 and 304 of the procedures that should be performed with the shared memory 106. In the preferred embodiment of the present invention, a polling routine is implemented for computer systems which have processors operating at speeds which allow polling to be conducted with small or no effect on user response time. Circuitry which monitors the memory marking unit 107 and generates interrupts are implemented for computer systems which have processors operating at speeds too slow to be able to effectively poll the contents of the memory marking unit.

Figure 4:
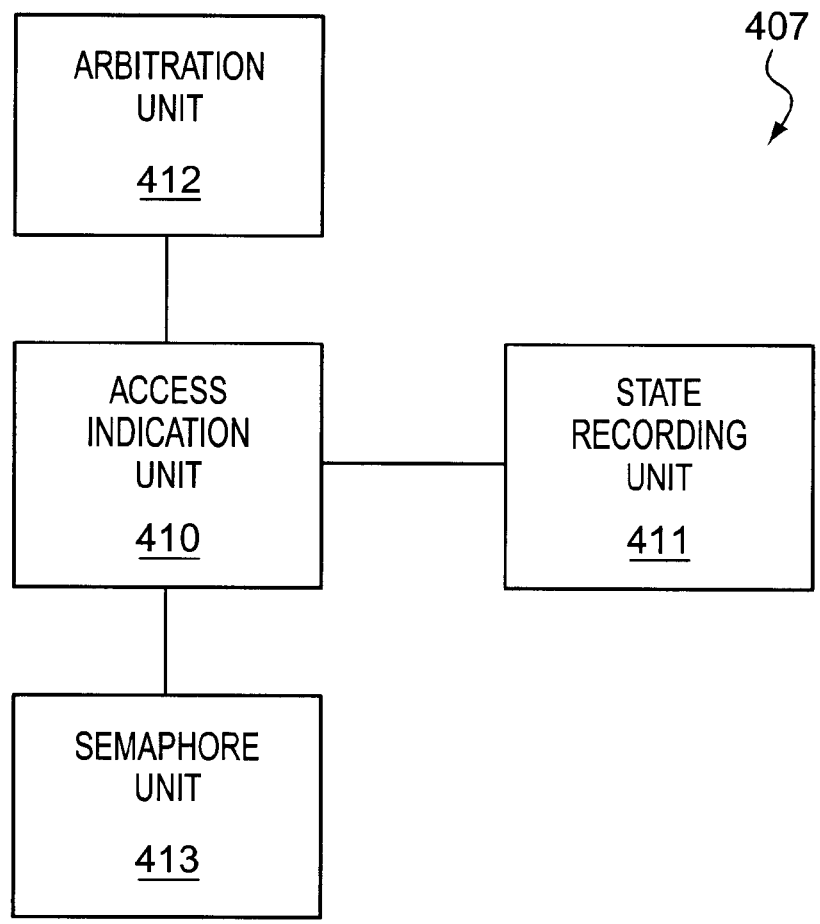
FIG. 4 illustrates a block diagram of a memory marking unit according to one embodiment of the present invention.

FIG. 4 illustrates a block diagram of an embodiment of the memory marking unit of the present invention. Memory marking unit 407 comprises access indication unit 410, state recording unit 411, arbitration unit 412, and semaphore unit 413. Access indication unit 410 operates to identify a processor which is currently accessing the shared memory. The contents of access indication unit 410 may be changed by a processor if the shared memory is not currently being accessed or if the processor changing the contents of the access indication unit 410 is the processor currently accessing the shared memory.

Arbitration unit 412 is coupled to access indication unit 410. Arbitration unit 412 provides hardware arbitration so that if more than one processor attempts to change the contents of access indication unit 410 at one time, only one will succeed. When more than one processor attempts to access the shared memory at one time, each of the processors will try to change the contents of the access indication unit 410 so that it indicates that they have access to the shared memory. Arbitration unit 412 can be programmed to give one processor priority over another or to use a predetermined physical property to arbitrate which processor has the right to change the contents of access indication unit 410 first.

Semaphore unit 413 is coupled to access indication unit 410. Semaphore unit 413 reads the contents of access indication unit 410. When access indication unit 410 identifies that a specific processor has access to the shared memory, semaphore unit 413 prevents any other processor from accessing the shared memory.

State recording unit 411 is coupled to access indication unit 410. State recording unit 411 operates to identify a task previously performed by a processor on the shared memory. The identity of a task is labeled as a state. The states recorded by state recording unit 411 may be changed only by a processor currently accessing the shared memory.

Figure 5:
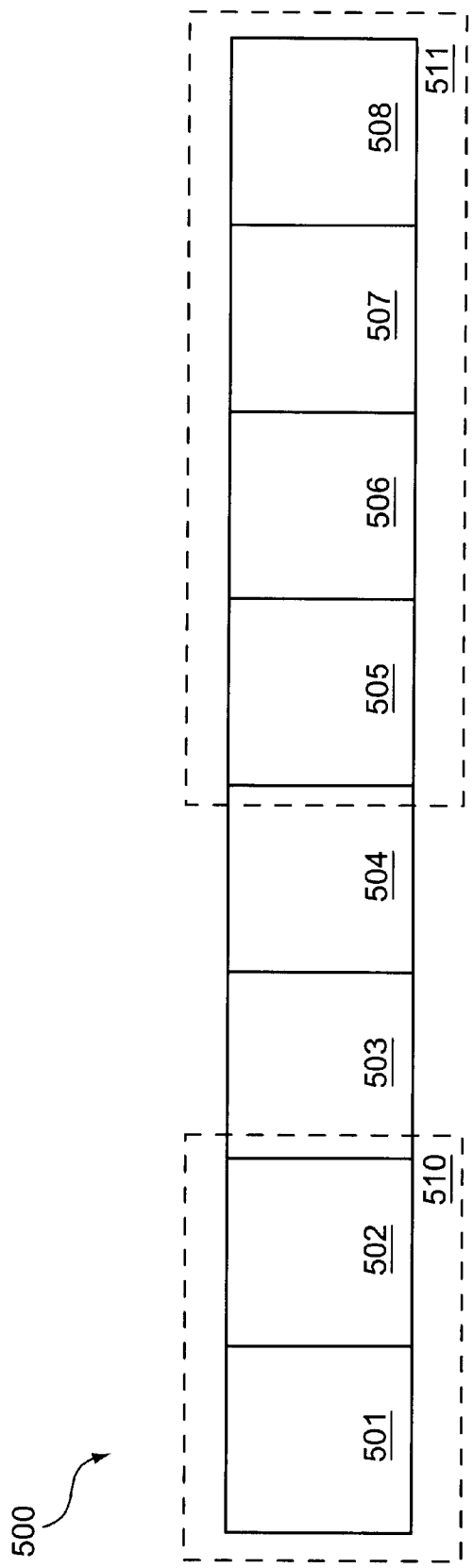
FIG. 5 illustrates one embodiment of an access indication unit and state recording unit according to one embodiment of the present invention.

FIG. 5 illustrates one embodiment of an access indication unit and a state recording unit of the present invention. State register 500 is a 8 bit register which comprises access indication unit 510 and state recording unit 511. State register 500 is located in the first byte of the shared memory. Locating the state register in the shared space is useful in that it allows the software to access the information just as it would access any other value in the computer's memory; some examples of prior art require special CPU instructions or the presence of a separate memory region. For communication between two separate systems, putting the semaphore/state unit in the same memory region allows control information and data to be communicated to share one "communication channel," as opposed to requiring another bus or any other communications path for the control information. The first two bits 501 and 502 of state register 500 represents the access indication unit 510. When a first processor has access to the shared memory, bit 501 is set at one and bit 502 is set at zero. When a second processor has access to the shared memory, bit 501 is set to zero and bit 502 is set to one. The last four bits 505, 506, 507, and 508 of state register 500 represent the state recording unit 511. State recording unit 511 can record up to sixteen different states. It is appreciated that additional bits can be used for the access identification unit 510 and state recording unit 511 when more than two processors have access to the shared memory or when more than sixteen states exist.

Figure 6:
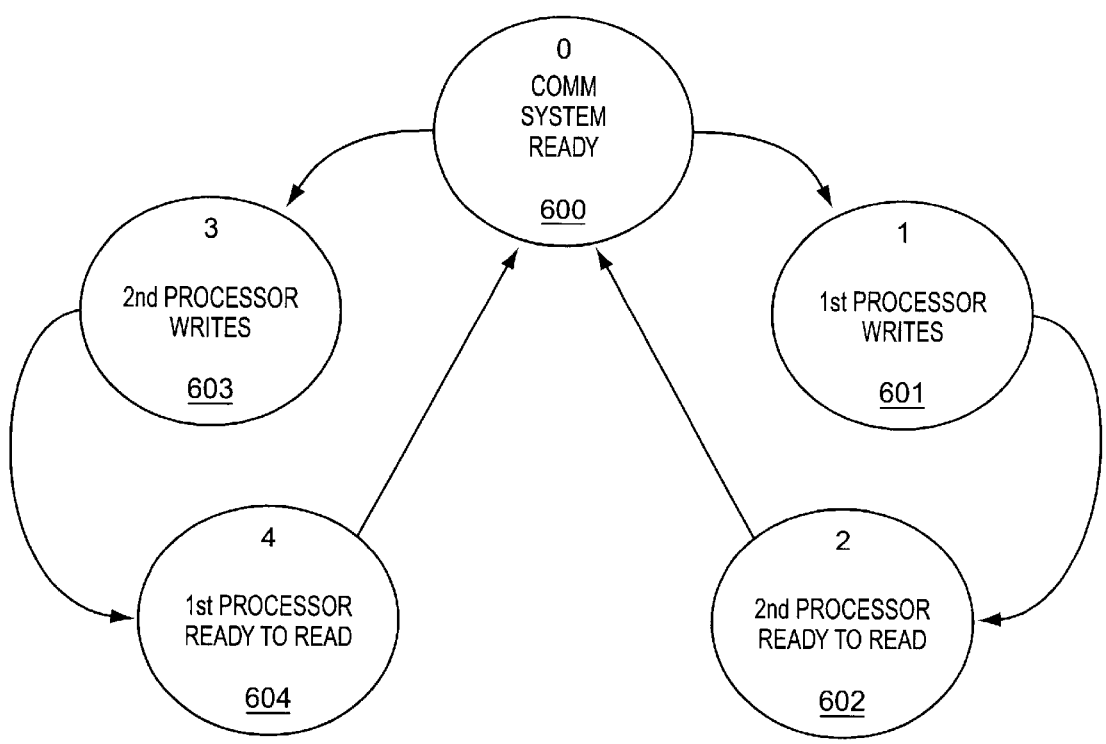
FIG. 6 is a state diagram of a state engine according to one embodiment of the present invention.

FIG. 6 is a state diagram of a state engine according to one embodiment of the present invention. FIG. 6 illustrates five states that can be implemented for arbitrating access of a shared memory between two processors. Circle 600 represents state 0. From state 0, the state engine may direct either processor to write to the shared memory. Circle 601 represents state 1. At state 1, a first processor writes data into the shared memory. From state 1, the state engine directs the second processor to read the data that was previously written into the shared memory. Circle 602 represents state 2. At state 2, the second processor is ready to read the data in shared memory. From state 2, the state engine returns to state 0. Circle 603 represents state 3. At state 3, a second processor writes data into the shared memory. From state 3, the state engine directs the first processor to read the data that was previously written into the shared memory. Circle 604 represents state 4. At state 4, the first processor is ready to read the data in shared memory. From state 4, the state engine returns to state 0.

Figure 7:
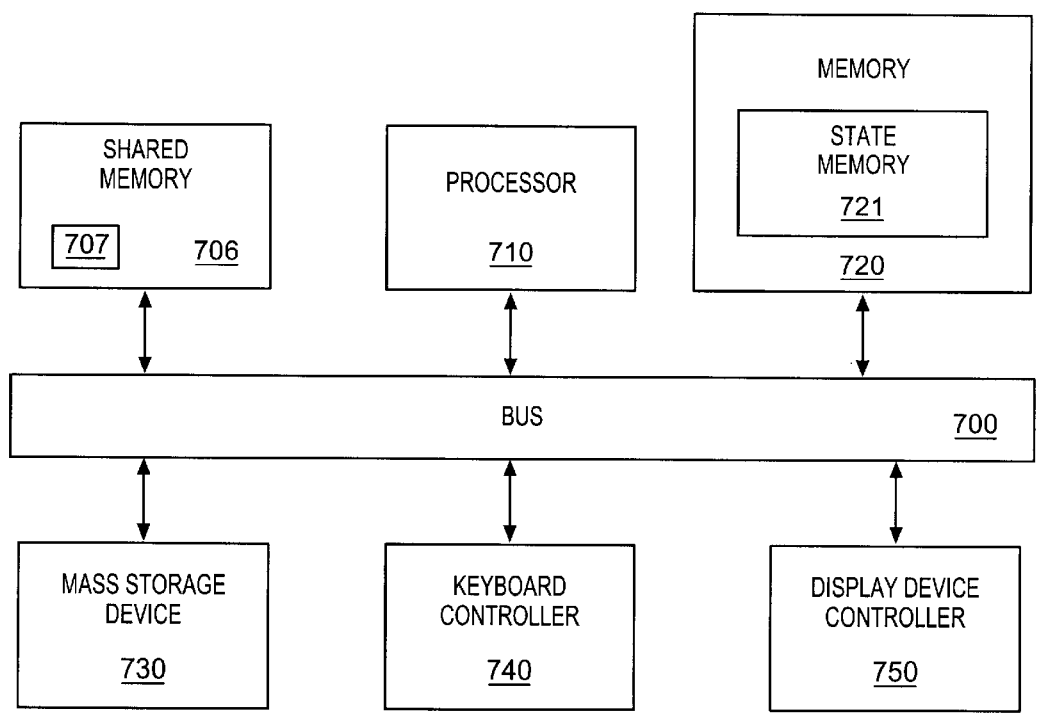
FIG. 7 illustrates a software implementation of the state engine of the present invention.

FIG. 7 illustrates in block diagram form a software implementation of the state engine of the present invention. The computer system comprises bus 700, microprocessor 710, memory 720, data storage device 730, keyboard controller 740, and display device controller 750.

Microprocessor 710 can be a complex instruction set computing (CISC) microprocessor, a reduced instruction set computing (RISC) microprocessor or other processor device. Microprocessor 710 executes instructions or code stored in memory 720 and performs operations on data stored in memory 720. The computer system further comprises a data storage device 730 such as a hard, floppy, or optical disk drive which is coupled to bus 700. Display device controller 750 is also coupled to bus 700. Display device controller 750 allows coupling of a display device to the computer system. Keyboard controller 740 allows coupling of a keyboard to the computer system and transmits signals from a keyboard to the computer system. Shared memory 706 and memory marking unit 707 function similarly to that of shared memory 106 and memory marking unit 107 as described in FIG. 1.

Memory 720 is coupled to the microprocessor 710 through bus 700. Memory 720 can be a dynamic random access memory (DRAM), static random access memory (SRAM) or other memory device. Memory 720 can store instruction or code executable by processor 710 that are part of application programs, operating system programs or other computer programs. Memory 720 comprises state engine 721. State engine 721 comprises a plurality of processor executable instructions that are executed by processor 710 in the manner shown in FIG. 8. State engine 721 performs functions similar to that of state engine 108 in FIG. 1.

Figure 8:
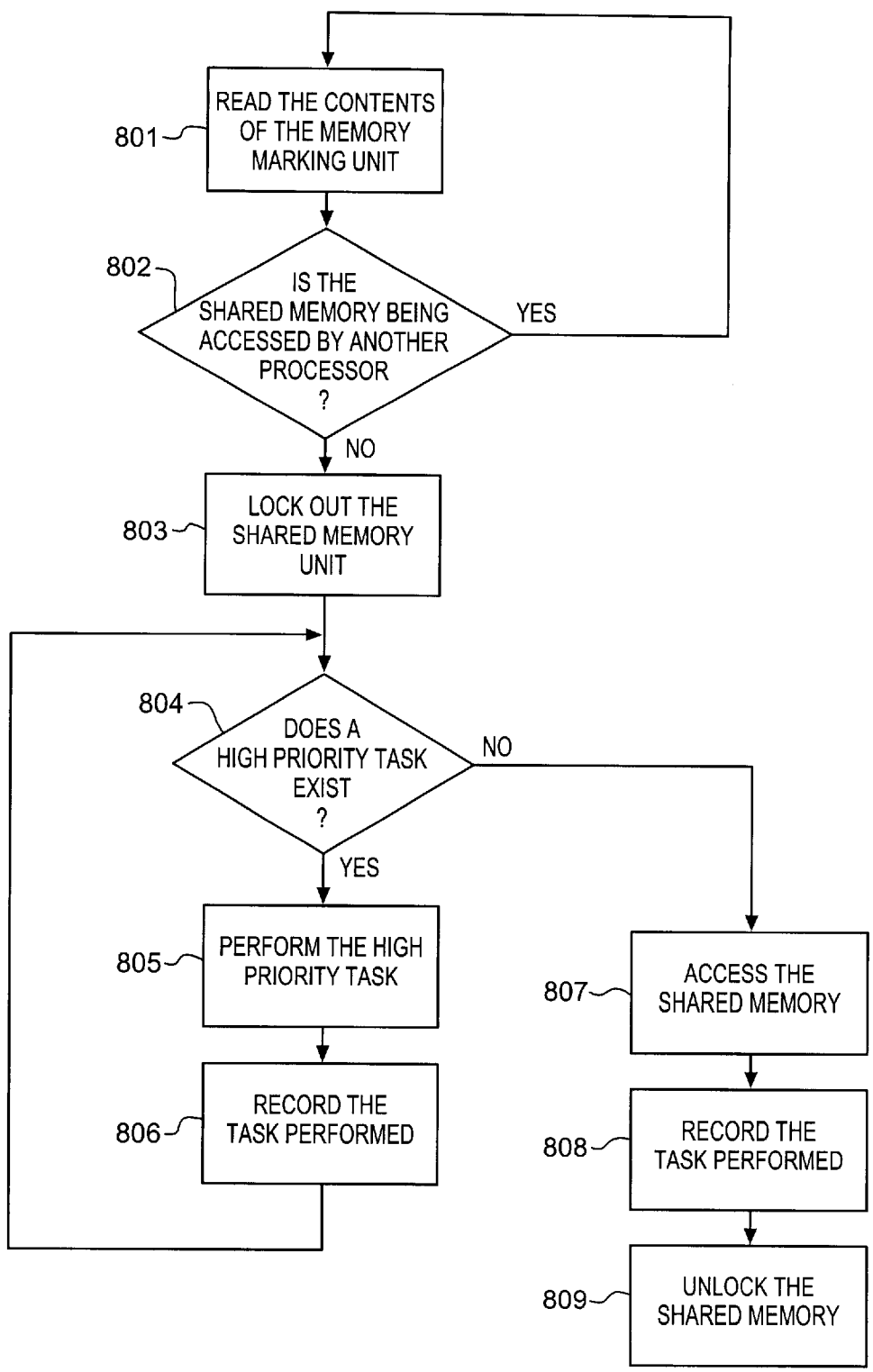
FIG. 8 is a flow chart illustrating a method for arbitrating access to a shared memory according to one embodiment of the present invention.

FIG. 8 is a flow chart illustrating a method for arbitrating access to a shared memory according to one embodiment of the present invention. First, read the contents of a memory marking unit in a shared memory as shown in block 801. The memory marking unit can be a state register for example. The memory marking unit contains information regarding whether a processor is currently accessing the state machine and identifies a last task performed on the shared memory. Next, determine whether the shared memory is currently being accessed by another processor as shown in block 802. If the shared memory is currently being accessed by another processor, go back to block 801. When the memory is being accessed by a first processor, a second processor seeking access must wait until the first processor is finished. If the shared memory is not being accessed by another processor, go to block 803. Block 803 instructs the routine to change the content of the memory marking unit so that it indicates that the shared memory is currently being accessed by a processor. Next, determine whether a task with high priority must be performed. This can be achieved by sending the information regarding the identity of the last task performed on the shared memory to a state engine. The state engine can contain a state table defining tasks that need to be performed based on a prior task. This is shown in block 804. If a task with high priority exists, go to block 805. If a task with high priority does not exist, go to block 807. If a task with high priority must be performed, instruct the processor which needs to perform the task to perform the task. This is shown in block 805. After the task is performed, record the task in the memory marking unit as shown in block 806. Next, go back to block 804 to determine whether another task with high priority must be performed. Then, allow the processor access to the shared memory for its original purpose. This is shown in block 807. After the processor has completed the task, record the task performed in the memory marking unit as shown in block 808. Change the information in memory marking unit so that it indicates that the shared memory is not currently being accessed by a processor. This is shown in block 809.

In the foregoing description, the invention is described with reference to specific exemplary embodiments thereof. It will, however, be evident that various modifications and changes may be made thereto without departing from the broader spirit and scope of the invention as set forth in the appended claims. The specifications and drawings are, accordingly, to be regarded in an illustrative rather than a restrictive sense.

Whereas many alterations and modifications of the present invention will be comprehended by a person skilled in the art after having read the foregoing description, it is to be understood that the particular embodiments shown and described by way of illustration are in no way intended to be limiting. Therefore, references to details of particular embodiments are not intended to limit the scope of the claims, which in themselves recite only those features regarded as essential to the invention.

What is claimed is:

1. A memory unit comprising:

a memory cell that stores data;

an access indication unit, coupled to the memory cell, that records an identity of a first processor accessing the memory cell;

a semaphore unit, coupled to the access indication unit, that prevents a second processor from accessing the memory cell while the identity of the first processor is recorded in the access indication unit; and a state recorder unit, coupled to the access indication unit, that records state information written by the first processor, the state recorder unit to provide a task last performed on the memory cell to a state engine which determines next tasks that may be performed on the memory cell.

2. The memory unit of claim 1 further comprising an arbitration unit, coupled to the access indication unit, that allows access of the memory cell to one processor at a time.

3. The memory unit of claim 1, wherein the access indication unit comprises a register.

4. The memory unit of claim 1, wherein the state recorder unit comprises a register.

5. A computer system comprising:

a bus;

a first processor coupled to the bus;

a second processor;

a shared memory unit comprising a memory cell that stores data, an access indication unit, coupled to the memory cell, that records an identity of the first processor accessing the memory cell, a semaphore unit, coupled to the access indication unit, that prevents the second processor from accessing the memory cell while the identity of the first processor is recorded in the access indication unit, and a state recorder unit, coupled to the access indication unit, that records state information written by the first processor, the state recorder unit to provide a task last performed on the memory cell to a first state engine which determines next tasks that may be performed on the memory cell.

6. The computer system in claim 5 further comprising:

a second state engine that instructs the second processor how to process data in the memory cell in response to reading the state information recorded in the state recording unit.

7. The computer system in claim 5 further comprising a monitoring unit, coupled to the state recorder unit, the monitoring unit monitoring the state information and sending an interrupt signal to the first processor that starts the first state engine when there is a change in the state information.

8. The computer system in claim 5 further comprising a polling unit, coupled to the state recorder unit, the polling unit monitoring the state recording unit after a predetermined amount of time and starting the first state engine when the polling unit detects a change in the state information.

9. The method of arbitrating access of a shared memory between a plurality of processors, comprising:

determining whether the shared memory is being accessed;

identifying a state of the shared memory, the state indicative of a task last performed;

determining next tasks that may be performed on the shared memory based upon the state of the shared memory; and granting access of the shared memory to a processor of the plurality of processors designated to perform one of the next tasks.

10. The method of claim 9, wherein determining whether the shared memory is being accessed is achieved by reading the contents of a semaphore register.

11. The method of claim 9, wherein identifying the state of the shared memory is achieved by reading state information in a state recording unit.

12. The method of claim 9, wherein determining the next tasks that may be performed on the shared memory is achieved by checking a next state in a state machine.

13. A computer system comprising:
a bus;
a first processor coupled to the bus;
a second processor;
a shared memory unit comprising a memory cell that stores data, an access indication unit, coupled to the memory cell, that records an identity of the first processor accessing the memory cell, a semaphore unit, coupled to the access indication unit, that prevents the second processor from accessing the memory cell while the identity of the first processor is recorded in the access indication unit, and a state recorder unit, coupled to the access indication unit, that records state information written by the first processor that is indicative of a task last performed on the memory cell, the task performed allowing a state engine to determine one or more next tasks to be performed on the memory cell.

* * * * *